United States Patent
Knittel et al.

(10) Patent No.: US 7,541,564 B2
(45) Date of Patent: Jun. 2, 2009

(54) OPTICAL PICKUP

(75) Inventors: Joachim Knittel, Tuttlingen (DE); Hartmut Richter, Villingen-Schwenningen (DE); Gael Pilard, Mönchweiler (DE)

(73) Assignee: Thomson Licensing, Boulogne-Billancourt (FR)

( * ) Notice: Subject to any disclaimer, the term of this patent is extended or adjusted under 35 U.S.C. 154(b) by 240 days.

(21) Appl. No.: 11/439,691

(22) Filed: May 23, 2006

(65) Prior Publication Data

US 2006/0285471 A1 Dec. 21, 2006

(30) Foreign Application Priority Data

Jun. 16, 2005 (EP) .................................. 05012989

(51) Int. Cl.
*G02B 7/04* (2006.01)
*G02B 27/40* (2006.01)
*G02B 27/64* (2006.01)

(52) U.S. Cl. ................ 250/201.5; 250/237 G; 369/112.02; 369/112.05; 369/124.02; 369/124.03

(58) Field of Classification Search ............ 369/112.02, 369/124.02, 124.03, 112.05, 112.06, 112.07, 369/112.09, 112.03, 112.04, 112.11, 112.12, 369/112.14

See application file for complete search history.

(56) References Cited

U.S. PATENT DOCUMENTS 6,218,655 B1 4/2001 Ogasawara et al.
6,687,196 B1 2/2004 Ueyanagi
2002/0027840 A1 3/2002 Morishita et al.
2005/0265203 A1* 12/2005 Takeuchi ............... 369/112.01

FOREIGN PATENT DOCUMENTS

WO WO 02/095742 A1 11/2002

OTHER PUBLICATIONS

Search Report Dated Nov. 16, 2005.
Sang Hwa Kim, Liang-Chy Chien: Optics Express, vol. 12, No. 7, Apr. 5, 2004, pp. 1238-1242, xp002354261.

* cited by examiner

*Primary Examiner*—Georgia Y Epps
*Assistant Examiner*—Francis M Legasse, Jr.
(74) *Attorney, Agent, or Firm*—Robert D. Shedd; Robert B. Levy; Jorge Tony Villabon

(57) ABSTRACT

The invention relates to an optical pickup for an optical recording medium, an electrically controlled diffraction grating suitable for use in such a pickup, and to an apparatus for reading from and/or writing to optical recording media using such an optical pickup or diffraction grating.

According to the invention, an optical pickup for optical recording media having two or more data tracks, with a light source for emitting a light beam for reading from and/or writing to an optical recording medium, includes an electrically controlled diffraction grating, which is switchable between at least two states for generating one or more light beams from the light beam emitted by the light source for reading from and/or writing to one or more of the data tracks.

6 Claims, 2 Drawing Sheets

OPTICAL PICKUP

This application claims the benefit, under 35 U.S.C. 119, of German patent application no. 05012989.9 filed Jun. 16, 2005.

FIELD OF THE INVENTION

The invention relates to an optical pickup for an optical recording medium, an electrically controlled diffraction grating suitable for use in such a pickup, and to an apparatus for reading from and/or writing to an optical recording medium using such an optical pickup or diffraction grating. More specifically, the pickup, the grating, and the apparatus are suitable for a super-resolution near field structure optical recording medium.

BACKGROUND OF THE INVENTION

Optical recording media with a super-resolution near field structure (super-RENS) offer the possibility to increase the data density of the optical recording medium by a factor of 3 in one dimension compared to a regular optical recording medium. This is made possible by a so-called super-RENS structure, which is placed directly above a data layer of the optical recording medium and significantly reduces the effective size of a light spot used for reading from and/or writing to the optical recording medium. At the same time the super-RENS structure allows to arrange more than one data track in each groove or land of the optical recording medium. An example of a super-resolution optical recording medium using three data tracks per groove/land is described in WO 2004/032123.

US 2002/027840 discloses an information read/write apparatus. The apparatus includes a dynamic control diffraction grating for adjusting the ration of the beam energy diffracted into the zero-order and higher-order light beams. In this way the energy of the side-beam used for tracking is kept at the same level during reading and recording.

For compatibility reasons it is desirable that an optical pickup for a super-resolution near field structure optical recording medium is also able to read from and/or write to optical recording media without a super-RENS structure or optical recording media with a super-RENS structure having only a single data track per groove and/or land. It is likewise desirable that an optical pickup for optical recording media having two or more data tracks is capable of accessing more than one data track at a time.

SUMMARY OF THE INVENTION

It is an object of the present invention to propose an optical pickup for reading from and/or writing to super-RENS optical recording media having two or more data tracks per groove and/or land, which is also capable of reading from and/or writing to super-RENS optical recording media having only one data track per groove and/or land and/or optical recording media without such a structure. It is a further object of the invention to propose an optical pickup for reading from and/or writing to optical recording media having two or more data tracks, which is capable of accessing more than one data track at a time.

These objects are achieved by an optical pickup for optical recording media having two or more data tracks, with a light source for emitting a light beam for reading from and/or writing to an optical recording medium, which includes an electrically controlled diffraction grating, which is switchable between at least two states for generating one or more light beams from the light beam emitted by the light source for reading from and/or writing to one or more of the data tracks, wherein a 0th order light beam is used for tracking and/or focus control. If such a pickup is used with a super-RENS optical recording medium having two or more data tracks per groove and/or land, one or more of the data tracks within the groove and/or land can be addressed by electrically controlling the grating such as to generate reading and/or recording light beams in the necessary diffraction orders. If the pickup is used with an optical recording medium without a super-RENS structure, by appropriately controlling the grating one data track as well as two or more data tracks at a time can be addressed.

An electrically controlled diffraction grating suitable for use in an optical pickup for reading from and/or writing to optical recording media having two or more data tracks is switchable between at least two states and generates one or more light beams from a light beam emitted by a light source for reading from and/or writing to one or more of the data tracks of an optical recording medium. By appropriately controlling the diffraction caused by the electrically controlled diffraction grating it is possible to control the number and order of appearing diffraction orders, as well as the fraction of the total energy of the light beam which is transferred into a specific diffraction order. This allows to address one data track as well as two or more data tracks at a time in case of an optical recording medium without a super-RENS structure, or to address one or more of the data tracks within a groove and/or land in case of a super-RENS optical recording medium having two or more data tracks per groove and/or land.

Preferably, in a first state the grating generates a diffracted light beam with a major fraction of the energy of the light beam emitted by the light source in a selected diffraction order, and a 0th order light beam with the remaining fraction of the energy of the light beam emitted by the light source. In this way the 0th order can still be used for tracking and/or focus control, while the diffraction order with the major fraction of the energy is used for recording on a specific data track.

Favorably, in a second state the grating essentially evenly distributes a major fraction of the energy of the light beam emitted by the light source over two or more diffracted light beams. The diffracted light beams may have different diffraction orders. In this way it is possible to simultaneously read data from two or more data tracks if dedicated detectors are provided for each light beam used for reading. Likewise, if the available energy of the light beam is sufficient, simultaneous recording on two or more data tracks is feasible. Again, the diffraction order receiving the remaining energy of the light beam, preferably the 0th order, can be used for tracking and/or focus control.

Advantageously, in a third state the grating has no diffracting effect on the light beam emitted by the light source. This state of the grating is especially useful if the optical recording medium has only a single data track per groove and/or land.

Preferably, the electrically controlled diffraction grating is rotatable for adjusting the distance between the generated light beams to the actual distance between the data tracks and the center of the groove/land. This allows to adjust the distance between the light beams to the actual distance between the super-RENS data tracks and the center of the groove/land. The compatibility of the optical pickup with optical recording media recorded with similar optical pickups from different manufactures is improved by additionally providing a servo system for rotating the grating.

A pickup or an electrically controlled diffraction grating according to the invention is advantageously used in an apparatus for reading from and/or writing to optical recording media.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERED EMBODIMENTS

Figure 1:
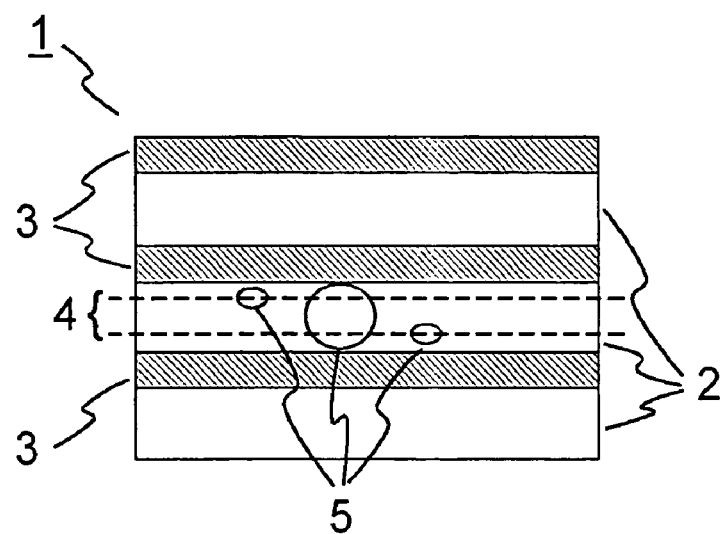
FIG. 1 shows an example of a super-resolution near field structure optical recording medium.

An example of a super-resolution near field structure optical recording medium 1 is shown in FIG. 1. Instead of writing the data in the center of a groove 2 (or land 3) two data tracks 4 are written symmetrically to the groove center. The data tracks are written and/or recorded using a plurality of light beams 5. The size of the light beams 5 illustrates the super-resolution effect. In principle, all three light beams 5 have a diffraction-limited focus diameter. However, above a certain intensity a super-resolution effect occurs and reduces the diameter. In the figure this intensity is only achieved for the outer light beams, while the central light beam remains below this intensity. For the illustrated optical recording medium 1 no special mastering tool is required to produce an optical recording medium with a smaller track pitch, which would be needed to increase the storage density if no super-RENS was used. Very often, e.g. in the case of a BluRay disk, the width of the lands 3 is smaller than that of the grooves 2. Therefore, the scheme uses the available surface quite efficiently.

Figure 2:
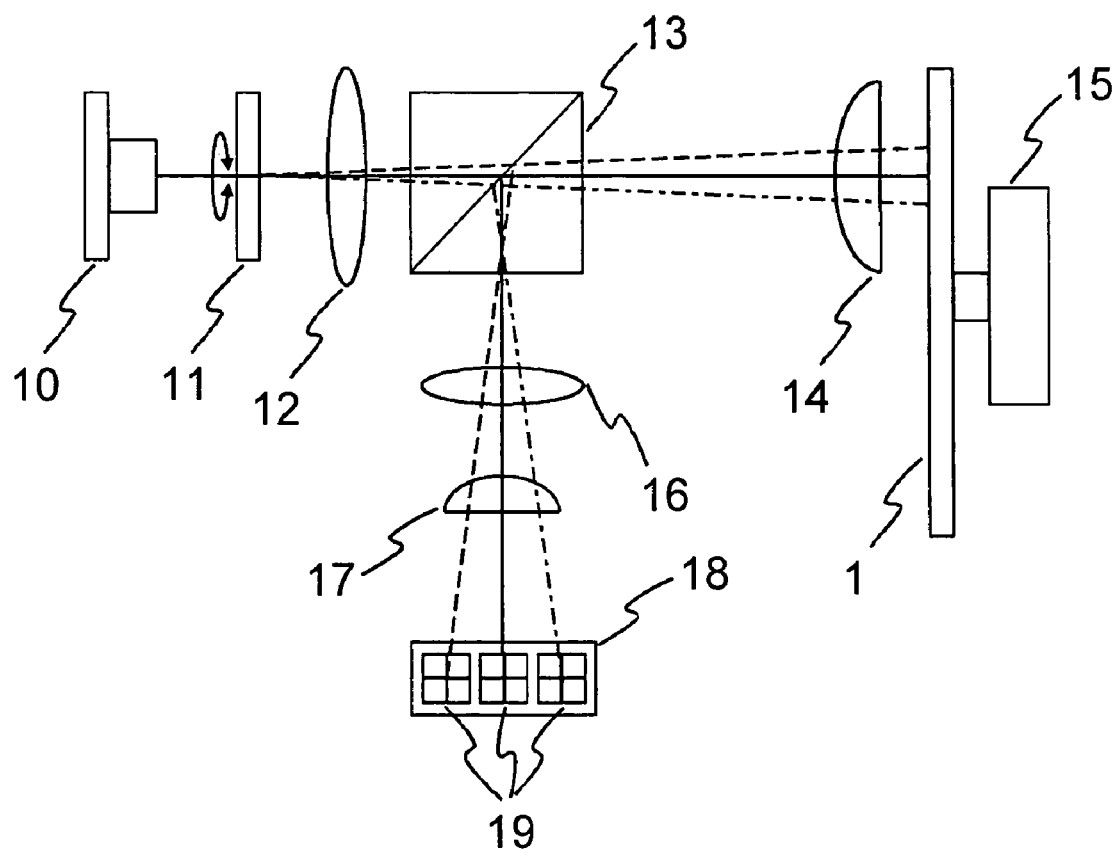
FIG. 2 depicts an optical pickup according to the invention.

FIG. 2 depicts an optical pickup according to the invention. A laser diode 10 emits a light beam, which is collimated by a collimator 12 and passes a beam splitter 13, before it is focused onto an optical recording medium 1 by an objective lens 14. The objective lens 14 is mounted on an actuator (not shown), which allows to adjust the position of the objective lens 14 relative to the data tracks on the optical recording medium 1. The optical recording medium 1 is driven by a motor 15. Light reflected from the optical recording medium 1 is collimated by the objective lens 14 and directed towards a detector 18 by the beam splitter 13. A focus lens 16 is provided for focusing the reflected light beam onto the detector 18. In addition, an astigmatic lens 17 introduces astigmatism in the light beam for focus control. The optical pickup essentially corresponds to a standard pickup as used, for example, for DVD or BluRay-disks. However, in the beam path an electrically controlled diffraction grating 11 is provided, which is capable of generating additional light beams. For detecting these additional light beams, the detector 18 uses a special detector pattern 19. Preferably the grating 11 is a blazed grating, using e.g. a special liquid crystal structure. An example of such an electrically controlled diffraction grating 11 is given by Kim et al. in Opt. Exp. 12, 1238-1242 (2004).

Figure 3:
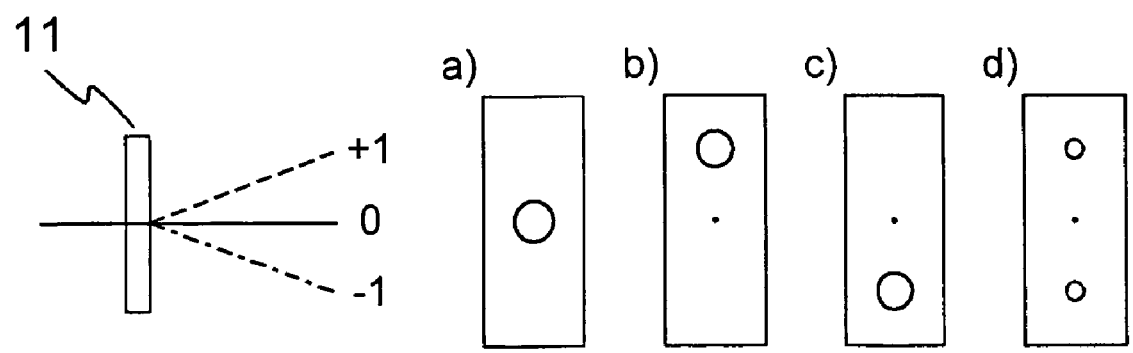
FIG. 3 shows the diffracted light beams for different states of an electrically controlled diffraction grating.

In the case of two data tracks 4 written symmetrically to the groove (and/or land) center, the grating has four different states. These states are depicted in FIG. 3, where the energy is represented by the diameter of the beam:

1. The grating has no diffracting effect on the light beam and simply transmits the incident light beam (Part a) of FIG. 3).
2. The grating splits the incident light beam into two separate beams, i.e. a +1st order beam and a $0^{th}$ order beam. Typically the +1st order beam has about 90% of the total energy, the 0th order beam about 10% of the total energy. The energy of the −1st order beam is essentially 0% (Part b) of FIG. 3).
3. Analog to case 2, but instead of the +1st order beam now the −1st order beam receives about 90% of the total energy (Part c) of FIG. 3).
4. The −1st order beam and the +1st order beam have an essentially equal energy of about 45% of the total energy, the 0th order beam again has 10% of the total energy (Part d) of FIG. 3).

In all four states the 0th order light beam is used for push-pull tracking and/or for focus control. Using only 10% of the available energy, no Super-RENS effect occurs, which could otherwise deteriorate tracking and/or focus control. The first state is used for reading from and/or writing to optical recording media with a single data track per groove and/or land, e.g. a DVD, a BluRay-disk, or an optical recording medium with a super-RENS structure having only a single data track per groove and/or land. The remaining states are used for reading from and/or writing to an optical recording medium with a super-RENS structure having two data tracks per groove and/or land, as shown in FIG. 1.

The second and the third state are employed for writing information to a single data track of the two data tracks. The grating generates two spots on the optical recording medium. The high power light beam is used for writing the information. The second, low power light beam allows to derive a tracking signal. The intensity of the second light beam is not sufficient for erasing the data on the optical recording medium. The fourth state enables to simultaneously read the information of the two adjacent data tracks of the super-RENS recording medium. Additional electronics and/or software may in this case by provided for reducing the cross talk between the two data tracks. By rotating the grating 11 it is possible to adjust the distance between the light beams to the actual distance between the super-RENS data tracks and the center of the groove/land. A servo system for rotating the grating 11 allows to improve the compatibility of the optical pickup with optical recording media recorded with similar optical pickups from different manufactures, or to adjust the pickup to different types of media with different track pitch.

Though the electrically controlled diffraction grating 11 has been described for an optical recording medium with a super-RENS structure employing two data tracks 4 symmetrically to the groove (and/or land) center, the diffraction grating can easily be modified to other even or odd numbers of data tracks. It is sufficient that the grating 11 allows to generate for each data track a light beam for reading and/or writing. This can easily be achieved by using higher diffraction orders such ±2 or ±3. The energy distribution between the different diffracted light beams can be controlled such as to allow simultaneous reading of all data tracks of a groove/land or any combination of data tracks of a groove/land. Likewise, depending on the available energy of the light beam, simultaneous writing of two or more data tracks can be achieved by providing individual intensity modulators for the different diffracted light beams.

What is claimed is:

1. Optical pickup for optical recording media having two or more data tracks, comprising:

a light source for emitting a light beam for reading from and/or writing to an optical recording medium, and an electrically controlled diffraction grating, which is switchable between at least two states for generating one or more light beams from the light beam emitted by the light source for reading from and/or writing to one or more of the data tracks, wherein in a first state one data track only is addressed for reading from and/or writing to, whereas in a second state two or more data tracks at a time are addressed for reading from and/or writing to, and wherein one or more of the generated light beams are used for addressing at least one of two or more data tracks arranged in a single groove or land of the optical record in medium, and a 0th order light beam is used for tracking and/or focus control based on the single groove or land.

2. Optical pickup according to claim 1, wherein in a first state the grating generates a diffracted light beam with a major fraction of the energy of the right beam emitted by the light source in a selected diffraction order, and a 0th order light beam with the remaining fraction of the energy of the light beam emitted by the light source.

3. Optical pickup according to claim 1. wherein in a second state the grating essentially evenly distributes a major fraction of the energy of the light beam emitted by the light source over two or more diffracted light beams.

4. Optical pickup according to claim 1, wherein in a third state the grating has no diffracting effect on the light beam emitted by the light source.

5. Optical pickup according to claim 1, wherein the electrically controlled diffraction grating is rotatable for adjusting the distance between the generated light beams to the actual distance between the data tracks and the center of the groove/land.

6. Apparatus for reading from and/or writing to optical recording media with a super-resolution near field structure having two or more data tracks within a groove and/or land, comprising an optical pickup according to claim 1.

* * * * *